United States Patent [19]

Logan

[11] 4,169,608
[45] Oct. 2, 1979

[54] FENDER EXTENSIONS

[75] Inventor: Gerald A. Logan, Portland, Oreg.

[73] Assignee: L.T.D. Enterprises, Inc., Portland, Oreg.

[21] Appl. No.: 869,917

[22] Filed: Jan. 16, 1978

[51] Int. Cl.² .............................................. B62D 9/16
[52] U.S. Cl. .............................................. 280/153 R
[58] Field of Search ......... 280/153 R, 152 R, 154.5 R

[56] References Cited

U.S. PATENT DOCUMENTS

| | | | |
|---|---|---|---|
| 2,143,939 | 1/1939 | Gross | 280/152 R |
| 4,012,053 | 3/1977 | Bade | 280/154.5 R |

Primary Examiner—Robert R. Song
Attorney, Agent, or Firm—Klarquist, Sparkman, Campbell, Leigh, Hall & Whinston

[57] ABSTRACT

The specification discloses fender extensions which have inner flanges fitting inside and fastening to the inwardly turned flanges of motor vehicle fenders. The inner flanges press edges of outer, cover portions of the extensions tightly against the sides of the fenders. In an alternate embodiment, the inner flange is stepped to provide a shoulder abutting the side of the fender as an aid for proper positioning.

11 Claims, 6 Drawing Figures

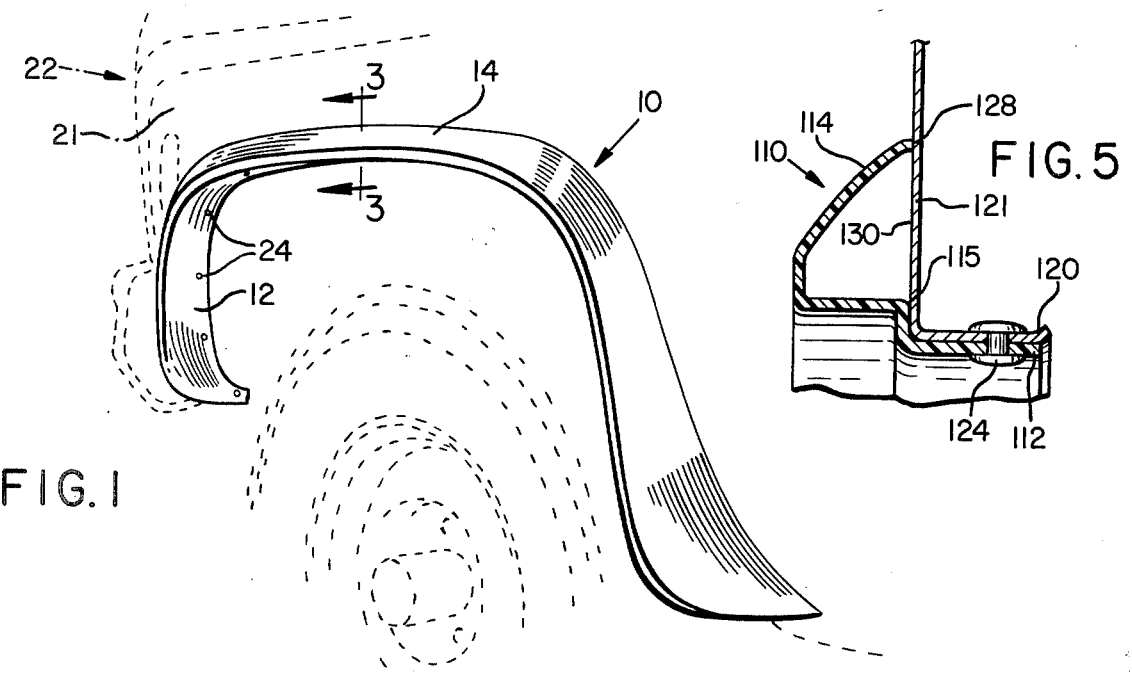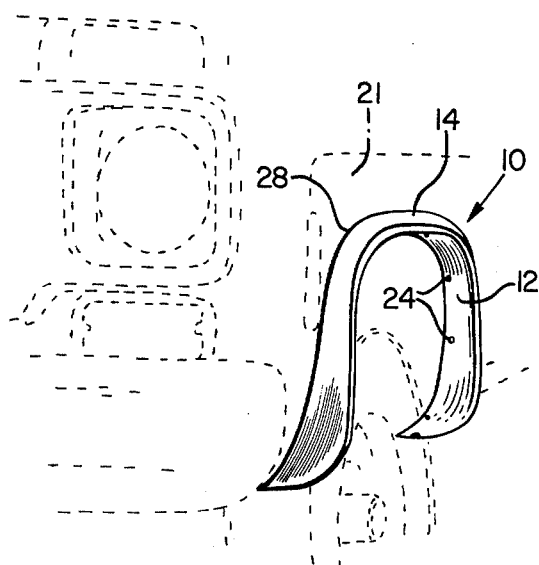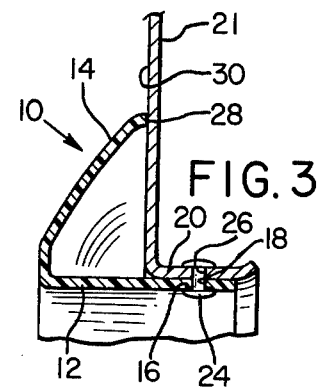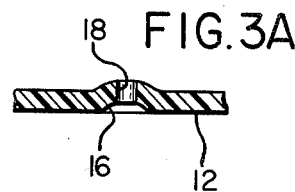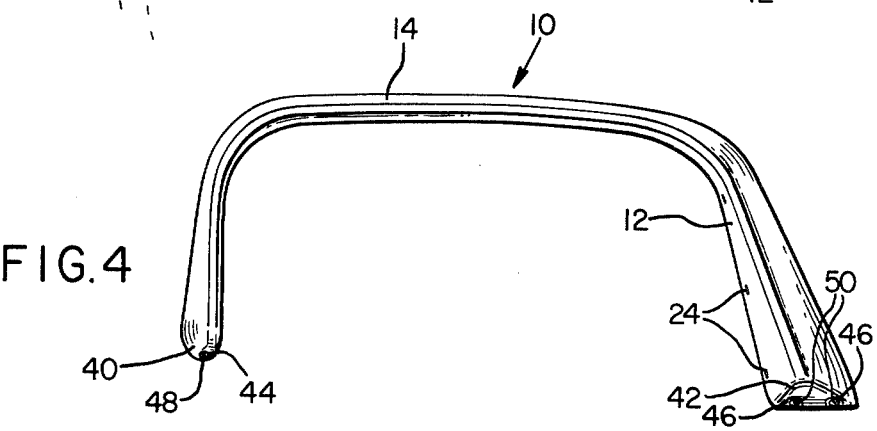

FENDER EXTENSIONS

DESCRIPTION

This invention relates to improved fender extensions, and has for an object thereof the provision of new and improved fender extensions.

Another object of the invention is to provide a fender extension that fits tightly on a fender and is so held by concealed fasteners.

A further object of the invention is to provide a fender extension which has an inner flange fitting and secured by mechanical fasteners to an inwardly turned flange of the fender and holding an edge of an outer cover tightly against the side of the motor vehicle.

Another object of the invention is to provide a fender extension having a stepped inner flange for precisely positioning the extension on a motor vehicle fender.

In the drawings:

FIG. 1 is a fragmentary, perspective view of a motor vehicle and a fender extension forming one embodiment of the invention;

FIG. 2 is a fragmentary, perspective view of the motor vehicle and the fender extension from a different point of view;

FIG. 3 is an enlarged, fragmentary section taken along line 3—3 of FIG. 1;

FIG. 3a is an enlarged, fragmentary section of an inner flange of the fender extension of FIG. 1;

FIG. 4 is a side elevation view of the fender extension of FIG. 1; and,

FIG. 5 is a sectional view similar to FIG. 3, but of a fender extension forming an alternate embodiment of the invention.

EMBODIMENT OF FIGS. 1–4

Fender extension 10 forming one specific embodiment of the invention includes an inner flange 12 and an outer, angular trim or cover 14. The extension preferably is of vacuum formable thermoplastic materials. Molded fiberglass or other plastic materials may also be used as well as ferrous or nonferrous materials and processes. The flange has dimples or countersinks 16 and drilled holes 18 and fits closely against inner face of inwardly turned flange 20 of a fender portion 21 of a motor vehicle 22. Pop rivets 24 extend through the drilled holes 18 and drilled holes 26 in the flange 20. In place of pop rivets, other mechanical fasteners may be used. The holes 18 and 26 are so positioned that edge 28 of the cover 14 is pressed tightly against side 30 of the fender portion 21, the cover 14 being flexed somewhat. The pop rivets, being in the inner flange, are not readily visible so that they may be considered concealed. The extension is secured by pressing the cover tightly against the fender to flex the cover and securing the cover to the fender in this condition. Lower end portions 40 and 42 of the fender extension have counterbores or depressions 44 and 46, and drilled holes 48 and 50 for pop rivets or the like to secure these end portions to the fender. The depressions are in the bottom end portions so that they are not readily visible. The flange 12 and the cover 14 are generally U-shaped in transverse cross-section. However, they may be generally V-shaped, if desired.

EMBODIMENT OF FIG. 5

A fender extension 110 forming an alternate embodiment of the invention is like the extension 10 except that an inner flange 112 is stepped to provide a shoulder or stop 115 acting as a gauge to press edge 128 of cover 114 against side 130 of fender portion 121 with a precise flex in the cover, the shoulder preferably being about one-eighth of an inch from the fender when the edge 128 first engages the side and the shoulder engaging the side 130 of the fender portion 121 when the extension is secured to the fender by pop rivets 124 or the like to flange 120 of the fender.

What is claimed is:

1. In a fender extension,
   a cover portion,
   and a curved inner flange portion integral with the cover portion and forming an outwardly extending hollow angle with the cover portion,
   the inner flange portion having fastener portions extending beyond the cover portion and adapted to be secured to an inwardly turned flange of a fender,
   the flange portion being adapted to press an edge of the cover portion against the side of the fender,
   the cover portion and the inner flange portion being generally V-shaped in transverse cross-section, the cover portion, the flange portion and the side of the fender defining a hollow space therebetween, the inner flange portion being generally curved so that it conforms to the bottom of the fender and the fastener portions adapted to be secured to the bottom of the inturned flange of the fender.

2. The fender extension of claim 1 wherein the fastener portions are a continuous edge portion of the inner flange portion.

3. The fender extension of claim 2 wherein the inner flange and cover portions are joined at their ends by sloping bottom portions.

4. The fender extension of claim 3 wherein the bottom portions have depressions and drilled holes to receive fasteners.

5. The fender extension of claim 4 including a stop portion on the inner flange portion for engaging the side of the fender.

6. The fender extension of claim 5 wherein the inner flange portion is stepped to form the stop portion.

7. The fender extension of claim 1 wherein the inner flange portion is stepped to form a shoulder adapted to abut the side of the fender.

8. In combination,
   a motor vehicle fender having a side and an inwardly turned flange,
   and a fender extension including an inner flange portion abutting the flange and secured thereto and a cover portion integral with the flange portion and held by the inner flange portion in a position pressing on the free edge of the cover portion against the side of the fender, the inner flange portion, the cover portion and the side of the fender for defining a hollow space therebetween,
   the fender extension being angular and hollow in transverse cross-section,
   the free edge portion of the flange portion being generally curved and fitting against the inwardly turned flange.

9. The combination of claim 8 wherein the inner flange portion is stepped to provide a shoulder abutting the side of the fender.

10. The combination of claim 8 wherein the extension has end portions provided with holes and counterbores surrounding the holes.

11. The combination of claim 10 wherein the end portions slope.

* * * * *